United States Patent [19]

Ogawa et al.

[11] Patent Number: 4,762,336
[45] Date of Patent: Aug. 9, 1988

[54] STRUCTURE FOR SUPPORTING LOWER SUSPENSION ARM ON VEHICLE CHASSIS

[75] Inventors: Hisashi Ogawa, Okazaki; Kazuhiko Yamashita, Toyota, both of Japan

[73] Assignee: Toyota Jidosha Kabushiki Kaisha, Aichi, Japan

[21] Appl. No.: 54,788

[22] Filed: May 27, 1987

[30] Foreign Application Priority Data

Jun. 6, 1986 [JP] Japan .................................. 61-131535

[51] Int. Cl.[4] ................................................. B60G 3/00
[52] U.S. Cl. ..................................... 280/673; 267/257; 267/279; 267/292; 280/671; 280/716
[58] Field of Search ................ 280/716, 717, 696, 701, 280/724, 666, 667, 668, 670, 671, 673; 267/257, 201, 202, 279, 281, 292

[56] References Cited

U.S. PATENT DOCUMENTS 3,195,914 7/1965 Rosky ..................................... 280/666
4,377,298 3/1983 Finn et al. ............................. 280/667

FOREIGN PATENT DOCUMENTS 1951271 4/1971 Fed. Rep. of Germany ...... 280/673
1216871 9/1960 France .................................. 280/673

Primary Examiner—Kenneth R. Rice
Attorney, Agent, or Firm—Parkhurst & Oliff

[57] ABSTRACT

A structure for swingably supporting a lower suspension arm of a vehicle suspension on the chassis of the vehicle through a bracket. The bracket has a main part swingably supporting the lower suspension arm and connected to the chassis, and an extension extending from the main part in the longitudinal direction of the chassis and connected at a position which is vertically spaced from the position at which said main part is connected to the chassis and on the opposite side of the axis of swinging of the lower suspension arm to the position where the main part is connected to the chassis. With this arrangement, displacement of the bracket by any force transmitted through the lower suspension arm and acting in the longitudinal direction is minimized.

13 Claims, 6 Drawing Sheets

STRUCTURE FOR SUPPORTING LOWER SUSPENSION ARM ON VEHICLE CHASSIS

BACKGROUND OF THE INVENTION

1. Field of the Invention

The present invention relates to a structure for supporting a lower suspension arm of a vehicle suspension on the chassis of a vehicle by means of a bracket.

2. Description of the Related Art

In general, a lower suspension arm of a vehicle suspension extends in the lateral direction of the chassis and is pivotally supported at its laterally inner end on a portion of the chassis. It is well known that the rigidity of the structure for supporting the lower suspension arm on the chassis significantly affects the control stability of the vehicle. More specifically, the control stability of the vehicle is appreciably improved by enhancing the rigidity of the structures through which the lower suspension arms associated with steerable front wheels are supported on the chassis. In order to improve the control stability, therefore, various types of lower suspension arm supporting structures have been proposed heretofore.

FIGS. 6 and 7 show an example of a known lower suspension arm supporting structure. In this structure, a lower suspension arm 10 of a front suspension has an L-like form composed of a front portion adjacent to the front end of a chassis and a rear portion adjacent to the rear end of the chassis, the front and rear portions being secured to the chassis independently of each other. For the details of this structure, a reference is made to "TOYOTA COROLLA/COROLLA LEVIN New Model Instruction Manual", pp 4-100, issued from the Service Dept. of Toyota Motor Co., Ltd. on May 12, 1983.

In this known structure, a connecting portion 12 in the front portion of the lower suspension arm 10 is pivotally connected through a bush 14 and a bolt 16 to a side member 13 which constitutes one of the structural members of the chassis, while a connecting portion 18 on the rear portion of the lower suspension arm 10 is pivotally connected through a bush 26 to a bracket 24 which is connected by bolts 22 to a dash panel cross-member 20 which also is a structural member of the chassis. In these Figures, an arrow FR represents the forward direction of the chassis, while an arrow IN indicates the laterally inward direction of the chassis. The upward direction is indicated by an arrow UP. Thus, the longitudinal direction, lateral direction and vertical direction with respect to the chassis are defined by those arrows FR, IN and UP, respectively. The same arrow symbols appearing throughout the drawings attached to this specification indicate the same directions.

This structure can have a reduced size since the lower suspension arm 10 serves also as a strut bar, yet exhibits a high rigidity because the lower suspension arm is supported at both of its ends with a sufficiently large supporting span.

The bracket 24 extends laterally across the lower suspension arm 10 and is connected at both of its lateral ends to the dash panel cross-member 20. Both connecting points are positioned at a level above the axis CL about which the lower suspension arm 10 swings. In consequence, the force applied to the lower suspension arm 10 in the longitudinal direction of the chassis acts on the bracket 24 at a point which is spaced downwardly from the points at which the bracket 24 is connected to the dash panel cross-member 20, with the result that a moment of force is produced tending to displace or deform the bracket 24, as indicated by arrows in FIG. 6.

In order to obviate this problem, Japanese Utility Model No. 23188/1981 entitled "Construction for Securing Suspension Arm in Front Suspension" proposes an improved structure for supporting a lower suspension arm. As shown in FIG. 8, this proposed supporting structure comprises a lower suspension arm supporting bracket 28 which extends in the forward and backward direction of the chassis, and has a lower suspension arm supporting portion which is closed at its rear end. The bracket 28 has a front end portion which is connected to the underside of a front side member 30 and a rear end portion which is connected to the lower end surface of a cross-member 32 and which is positioned at a level vertically above the level of the front side member 30. Since the bracket 28 has an enhanced rigidity, the force transmitted through the lower suspension arm and acting on a second bracket (not shown) in the longitudinal direction of the chassis causes only a small displacement of the bracket 28. Unfortunately, however, this improved structure cannot reduce the displacement of the bracket 28 to an acceptable level, because a moment of force is also produced in this structure due to the fact that the points at which the bracket 28 is connected to the chassis are located above the swinging axis CL of the lower suspension arm.

Another improved structure is proposed in Japanese Unexamined Utility Model Publication No. 157486/1985 entitled "Construction of Automotive Body". In this structure, a front side member on which the lower suspension arm is supported engages with a steering support cross-member through a rigid member. According to this structure, the displacement of the front side member in the lateral direction of the chassis is suppressed so that the lower suspension arm supporting structure exhibits an extremely high rigidity against lateral force. However, this structure is not arranged to exhibit rigidity of a level which is large enough to suppress the displacement of the bracket.

SUMMARY OF THE INVENTION

Accordingly, an object of the present invention is to provide a structure for supporting a lower suspension arm on the chassis of a vehicle, wherein the displacement of a bracket through which the lower suspension arm is supported is minimized, thereby obviating the above-described problems of the prior art.

Another object of the present invention is to provide a structure for supporting, by means of a bracket, a lower suspension arm which supports on a portion of the chassis in such a manner as to permit the lower suspension arm to swing. The bracket possesses a main part which swingably supports the lower suspension arm and is connected to the chassis, and an extension which extends from the main part in the longitudinal direction of the chassis and is connected to the chassis at a position which is vertically spaced from the position at which the main part is connected to the chassis and which is on the opposite side of the axis of swinging of the lower suspension arm to the position where the main part is connected to the chassis.

Still another object of the present invention is to provide a structure for supporting a lower suspension arm at a portion of the chassis through a bracket in which the displacement of the bracket caused by a force transmitted through the lower suspension arm and acting in the longitudinal direction of the chassis is minimized.

In the lower suspension arm supporting structure in accordance with the present invention, the bracket through which the lower suspension arm is swingably supported on a portion of the chassis has a main part which swingably supports the lower suspension arm and is connected to the chassis. Further, the bracket possesses an extension which extends from the main part in the longitudinal direction of the chassis and is connected to the chassis at a position which is vertically spaced from the position at which said main part is connected to the chassis and which is on the opposite side of the axis of swinging of the lower suspension arm to the position where the main part is connected to the chassis.

Since the position at which the main part of the bracket is connected to the chassis and the position at which the extension of the bracket is connected to the chassis are vertically spaced from each other and are disposed on opposite sides of the axis of swinging of the lower suspension arm, the force transmitted through the lower suspension arm which acts on the bracket in the longitudinal direction of the chassis is suitably decomposed into components which are shared by the points where the main part and the extension of the bracket which are formed unitary by press work are respectively connected to the chassis at a first and second connecting portions with a difference in level, so that undesirable displacement of the bracket which tends to occur due to such a force is minimized.

Further objects and many of the attendant advantages of the present invention will be readily appreciated as the same becomes better understood by reference to the following description when read in conjunction with the accompanying drawings.

BRIEF DESCRIPTION OF THE DRAWINGS

The accompanying drawings illustrate the preferred embodiments of the present invention. Throughout the drawings, the same reference numerals illustrate the same parts of the invention, in which.

DESCRIPTION OF THE PREFERRED EMBODIMENTS

Figure 1:
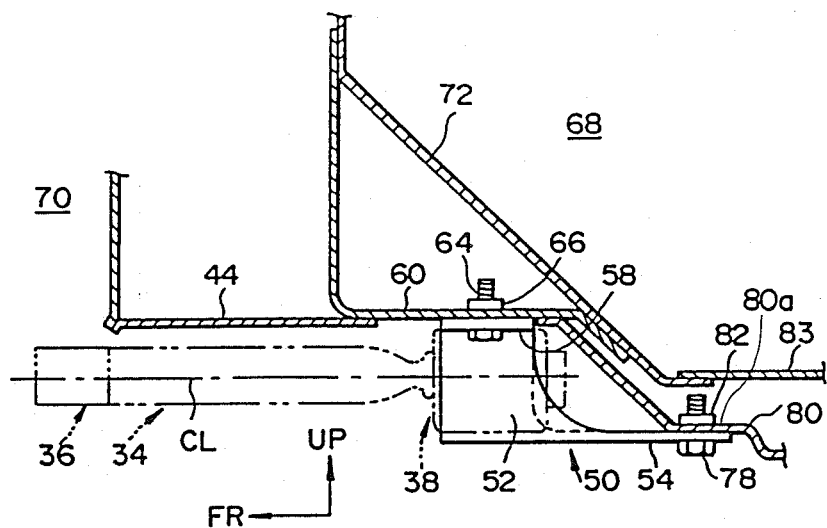
FIG. 1 is a sectional view of a first embodiment of a lower suspension arm supporting structure in accordance with the present invention, as viewed from a lateral side of a vehicle chassis on which the lower suspension arm is to be supported.
Figure 2:
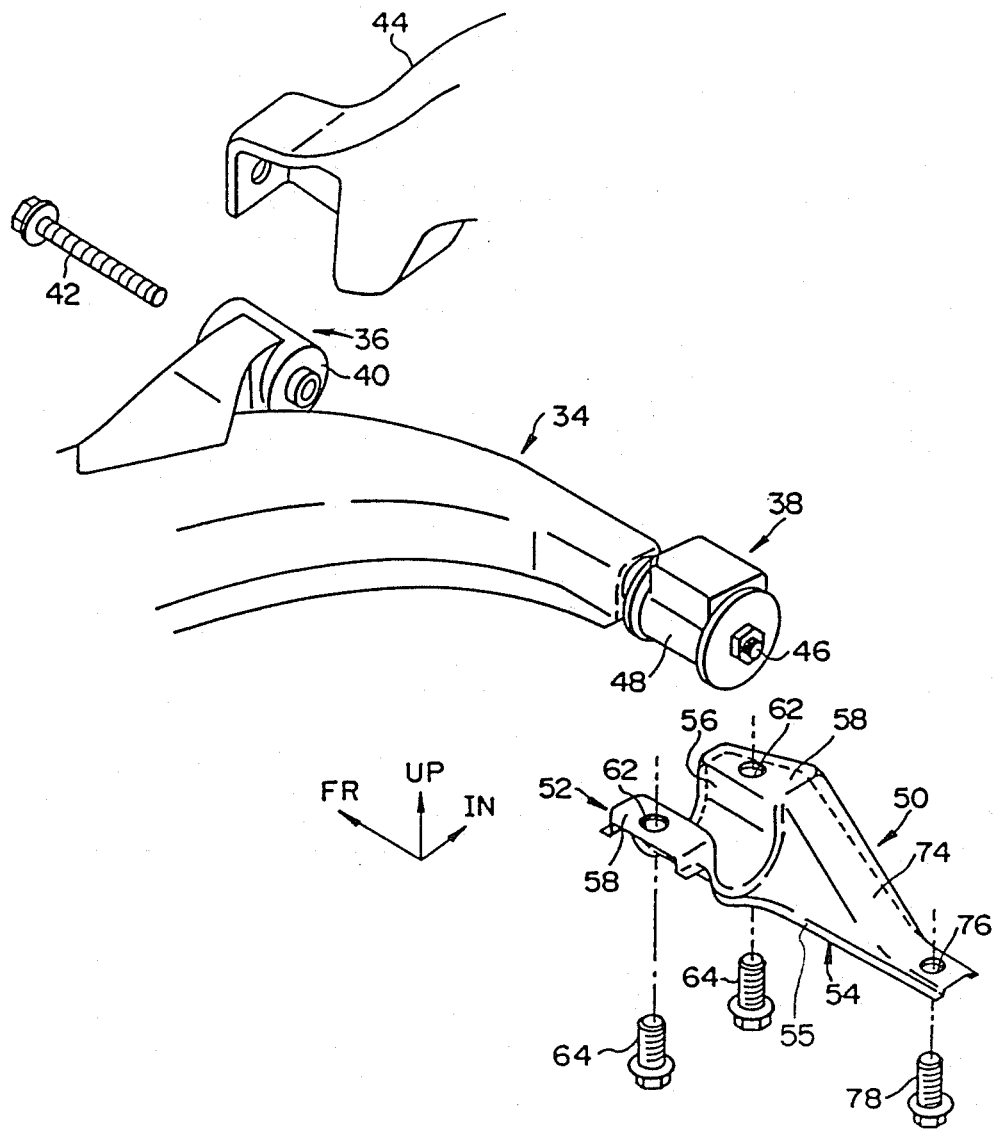
FIG. 2 is an exploded perspective view of an essential portion of the embodiment shown in FIG. 1.

Referring to the drawings, particularly to FIGS. 1 and 2, there is shown a first embodiment of the lower suspension arm supporting structure in accordance with the present invention.

The lower suspension arm 34 generally has an L-like form with a front portion and a rear portion adjacent to the front end and the rear end of a vehicle chassis, respectively. A connecting portion 36 of the front portion and a connecting portion 38 of the rear portion are supported on the chassis independently of each other. More specifically, the connecting portion 36 of the front portion of the lower suspension arm 34 is pivotally connected to a front side member 44 through a bush 40 and a bolt 42, as in the case of the known arrangement. On the other hand, the mount portion 38 of the rear portion of the lower suspension arm 34 is provided with a journal portion 46 on which is fit a bush 48 having a flattened top surface. The bush 48 is supported by a bracket 50 which in turn is secured to the chassis. The lower suspension arm 34 is swingable about an axis CL which coincides both with the axis of the bolt 42 and the axis of the journal 46.

The bracket 50 possesses both a main part 52 which supports the bush 48 and an extension 54 which extends from the main part 52 rearwardly of the vehicle chassis. The main part 52 and the extension 54 are formed integrally by press.

As illustrated in FIGS. 1 and 2, side edge portions of the bracket 50 are bent such as to form flange-like portions 55. The main part 52 has a substantially U-shaped cross-section. Flat connecting portions 58, each possessing a bolt hole 62, are located on both sides of a recess 56 of the main part 52. Bolts 64 extend through the bolt holes 62, and are screwed into threaded holes which are located in nuts 66. Nuts 66 are welded to a dash panel cross-member 60. Accordingly, the connecting portions 58 and, hence, the bracket 50 are securely connected to the dash panel cross-member 60. In this state, the bush 48 fits in the recess 56 of the bracket 50 so as to be restrained by the main part 52 and the dash panel cross-member 60.

The dash panel cross-member 60 is connected to the lower side of a dash panel 72 which separates a compartment 68 and an engine room 70 of the vehicle from each other, such as to extend in the lateral direction of the vehicle chassis. Thus, the dash panel 72 and the dash panel cross-member 60 cooperate with each other in defining therebetween a space of a closed cross-section.

The extension 54 of the bracket 50 extends from a portion of the main part 52 between the connecting portions 58 on the laterally inner side of the recess 56 and the portion near the bottom of the recess 56. A surface 74 extends rearwardly from the above-mentioned connecting portion 58. The surface 74 slants in a rearward and downward direction from one of the connecting portions 58, and has a flat and horizontal rear end portion which is provided with a bolt hole 76. The extension 54 of the bracket 50 is connected to the underside of a horizontally disposed flat portion 80a of a reinforcement 80 by means of a bolt 78. The bolt 78 extends through the bolt hole 76 and is screwed into a threaded hole in a nut 82 which is welded to an upper side of the flat portion 80a.

The floor under reinforcement 80 is a member which has a hat-like cross-section and is connected to the dash panel cross-member 60 and a dash panel 72. The floor under reinforcement 80 also is connected to a floor pan 83 which in turn is connected to the dash panel 72. The flat portion 80a is connected to the extension 54 by the bolt 78 at a point which is located on a side opposite of the axis CL to the point at which the main part 52 is connected to the dash panel cross-member 60 by the bolts 64. More specifically, these points of connection are spaced from each other in the vertical direction across the axis CL of swinging.

In operation, any force acting on the lower suspension arm 34 in the forward and backward directions is transmitted to the bracket 50 through the bush 48. In the described embodiment, however, any tendency for the bracket 50 to be displaced about the point where it is connected to the chassis is prevented by virtue of the fact that the main part 52 of the bracket 50 is connected to the dash panel cross-member at points which are above the axis CL of swinging while the extension 54 is coupled to the flat portion 80a at a point which is below the axis CL of swinging. Thus, the lower suspension arm supporting structure of the described embodiment exhibits a high level of rigidity, so that changes in the geometrical arrangement of the suspension are reduced, thereby ensuring a higher degree of control stability and maintaining wheel alignment of the vehicle.

The first embodiment described hereinbefore is applied to a bracket 50 which is used in combination with an L-shaped lower suspension arm 34. However, it will be clear to those skilled in the art that the described embodiment can equally be applied to brackets designed for use in combination with various other types of lower suspension arms. It is also possible to modify the described embodiment so that the front portion (i.e., main part 52) and the rear portion (i.e., extension 54) of the bracket 50 are connected to the chassis at points below and above the axis CL of swinging, respectively. This arrangement is in contrast to the described embodiment in which these portions are connected to the chassis at positions above and below the axis CL of swinging. Similarly, the bracket 50 may be so designed that its main part 52 is on the rear side while the extension 54 is on the front side on the vehicle chassis, unlike the described embodiment in which the main part 52 and the extension 54 are disposed on the front and rear sides, respectively.

Figure 3:
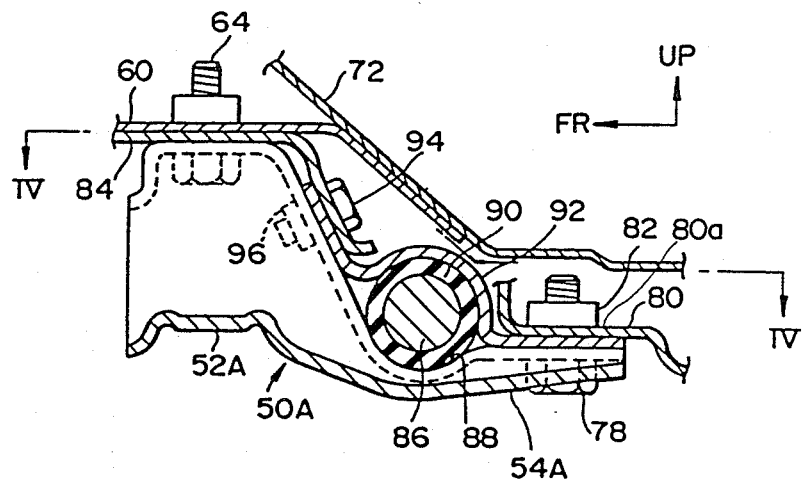
FIG. 3 is a sectional view of a second embodiment as viewed from a lateral side of the chassis.
Figure 4:
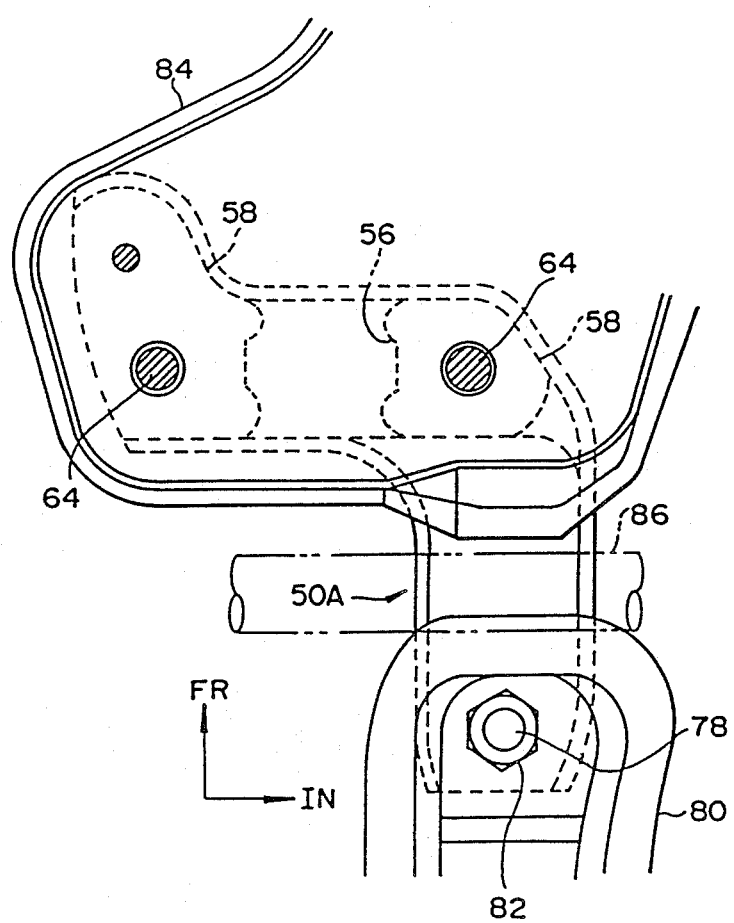
FIG. 4 is a plan view taken along the line IV—IV of FIG. 3.
Figure 5:
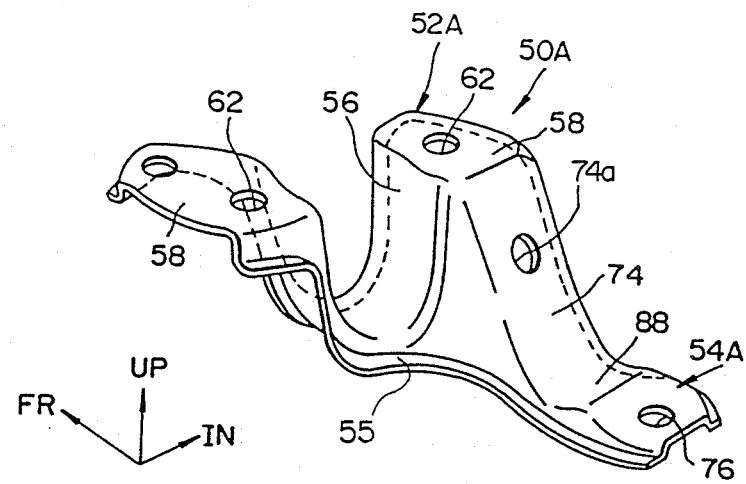
FIG. 5 is a perspective view of a bracket incorporated in the second embodiment.
Figure 6:
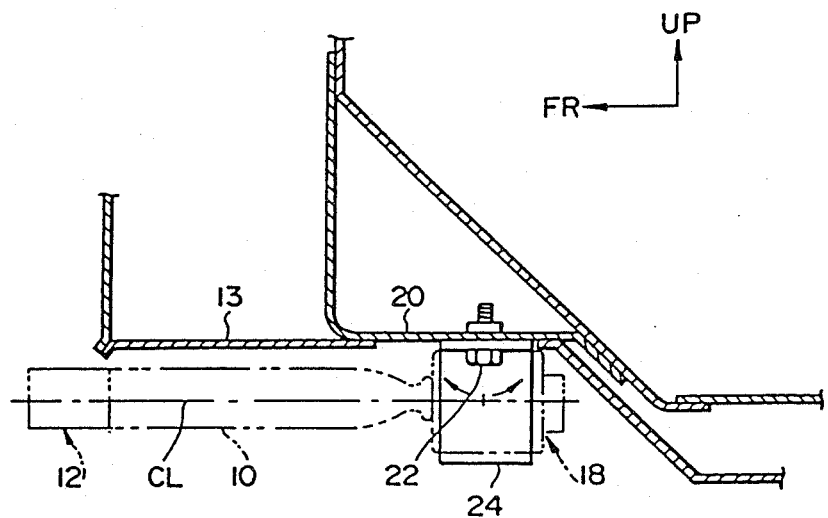
FIG. 6 is a sectional view of a known lower suspension arm supporting structure as viewed from a lateral side of the chassis.
Figure 7:
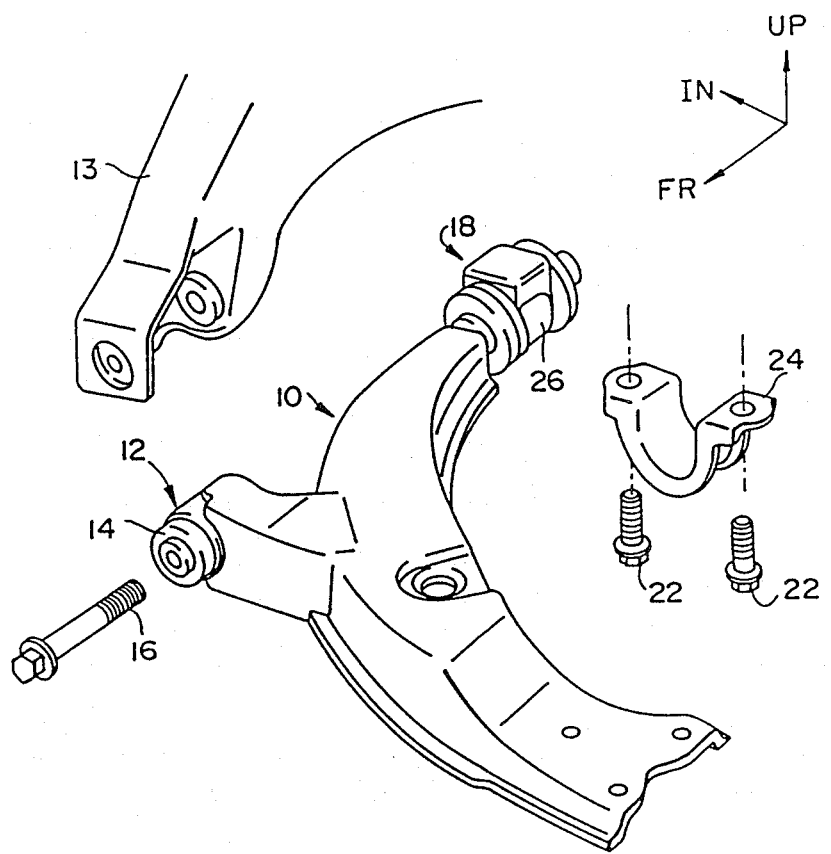
FIG. 7 is an exploded perspective view of an essential portion of the arrangement shown in FIG. 6.
Figure 8:
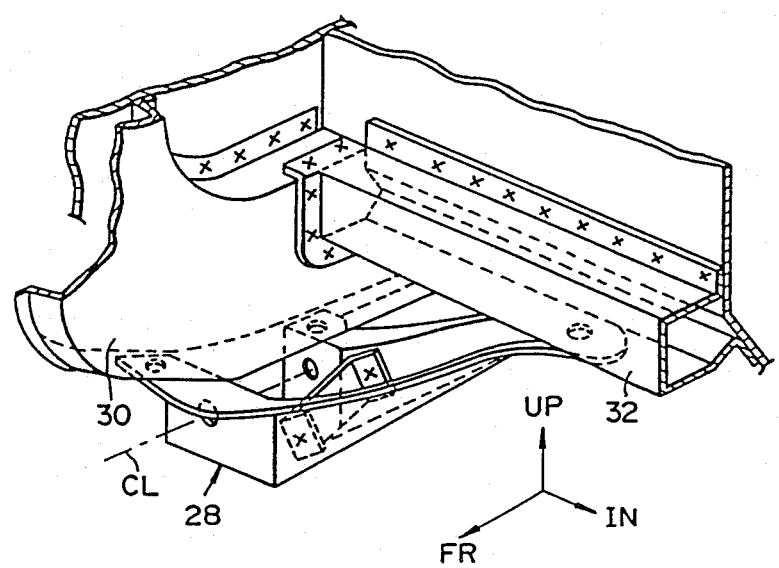
FIG. 8 is a perspective view of another known structure as viewed from the same side as the engine room of a vehicle.

FIGS. 3 through 5 show a second embodiment of the lower suspension arm supporting structure in accordance with the present invention. This embodiment is distinguished from the first embodiment shown in FIGS. 1 and 2 in that the lower suspension arm supporting structure has a first bracket 50A possessing a main part 52A which is supported on the chassis through a sub-frame 84 and in that the first bracket 50A supports a stabilizer 86. More specifically, an extension 54A of the first bracket 50A is provided with a recess 88 for receiving the stabilizer 86 and also with a bolt hole 76 for receiving a bolt 78 which aids in securing the stabilizer 86 between the first bracket 50A and second bracket 92 assemblies. The stabilizer 86, together with a bush 90 fitting thereon, is held in the recess 88 by the second bracket 92.

The front end portion of the second bracket 92 is connected to the surface 74 together with the rear end portion of the sub-frame 84. This connection is achieved by a bolt 94 which extends through overlapping bolt holes (not shown) located in the second bracket 92 and the sub-frame 84, together with a bolt hole 74a located in the surface 74. The rear end portion of the second bracket 92 is sandwiched between the extension 54A and the flat portion 80a. The extension 54A is secured to the flat portion 80a by a bolt 78 which is driven through overlapping bolt holes (not shown) formed in the rear end of the bracket 92 and the flat portion 80a, together with the bolt hole 76 located in the extension 54A. As in the case of the first embodiment, the side edges of the bracket 50A are bent to provide flange-like portions 55, as is clearly shown in FIG. 5.

The sub-frame 84 is clamped between the main part 52A and the dash panel cross-member 60. The main part 52A is secured to the dash panel cross-member 60 by means of a bolt 64 driven through bolt holes (not shown) formed in the subframe 84 and in the dash panel cross-member 60, together with the bolt hole 62 located in the main part 52A.

As will be understood from the foregoing description, the lower suspension arm supporting structure in accordance with the present invention can minimize any displacement of the bracket which may be caused by a force transmitted through the lower suspension arm which acts in the longitudinal direction of the chassis.

The invention may be embodied in other specific forms without departing from its spirit or essential characteristics. The described embodiments are to be considered in all respects only as illustrative and are not limiting. The scope of the invention is, therefore, indicated by the appendant claims rather than by the foregoing description. All changes which come within the meaning and range of the claims are considered within their scope. Consequently, it is recognized that many variations may be made without departing from the scope or spirit of the present invention.

What is claimed is:

1. A structure for supporting a lower suspension arm having a swinging axis of a vehicle suspension of a type employing a bracket which swingably connects said lower suspension arm to the chassis of the vehicle, comprising:
   a main part of said bracket connected at a first connecting portion to said chassis and swingably supporting one end of said lower suspension arm;
   an extension of said bracket extending from said main part in the longitudinal direction of said chassis, said extension being connected to said chassis at a second connecting portion which is vertically spaced from said connecting portion of said main part and on an opposite side of said swinging axis to said connecting portion of said main part, and
   said first and second connecting portions being disposed with a difference in level therebetween, and said swinging axis being positioned between said first and second connecting portions.

2. A structure for supporting a lower suspension arm of a vehicle suspension according to claim 1, wherein said lower suspension arm has an L-like form with a front portion adjacent to the front end of said chassis and a rear portion adjacent to the rear end of said chassis supported by said chassis independently of each other, said rear portion being connected to said chassis through said bracket.

3. A structure for supporting a lower suspension arm of a vehicle suspension according to claim 1, wherein said main part of said bracket is disposed frontwards of said extension and said connecting portion of said main part is located above said swinging axis and on each lateral side of said lower suspension arm.

4. A structure for supporting a lower suspension arm of a vehicle suspension according to claim 1, wherein said bracket is connected to said chassis by a screw means.

5. A structure for supporting a lower suspension arm of a vehicle suspension according to claim 1, wherein said main part and said extension of said bracket are formed unitary by press work.

6. A structure for supporting a lower suspension arm of a vehicle suspension according to claim 1, wherein said bracket is provided with a stabilizer.

7. A structure for supporting a lower suspension arm of a vehicle suspension according to claim 1, wherein said extension is bent in a direction which crosses the direction of extension thereof so as to impart a high rigidity to said bracket.

8. A structure for supporting a lower suspension arm of a vehicle suspension comprising:
a bracket having a main part provided on the upper end thereof with flat connecting portions which are spaced from each other by a recess formed therebetween, said main part being adapted to be connected to the chassis of the vehicle at said connecting portions, and an extension extending from said main part in the longitudinal direction of said chassis and connected to said chassis at a position which is vertically spaced from said connecting portions of said main part and on an opposite side of a swinging axis of said lower suspension arm as said connecting portions of said main part;
said main part and extension being respectively securely connected to a cross-member and a reinforcement to fix on the chassis,
a bush provided on the end of said lower suspension arm to be connected to said bracket, said bush having a flattened upper surface and a lower portion having a configuration which conforms with said recess in said main part of said bracket.

9. A structure for supporting a lower suspension arm of a vehicle suspension according to claim 8, wherein said extension of said bracket is bent a plurality of times in directions which cross the direction in which said extension extends, so as to increase the rigidity of said bracket, and wherein bolt holes for receiving bolts which secure said bracket to said chassis are formed in said flattened connecting portions of said main part and in said extension of said bracket.

10. A structure for supporting a lower suspension arm of a vehicle suspension according to claim 8, wherein said main part and said extension of said bracket are formed unitary with each other by press work.

11. A structure for swingably supporting a lower suspension arm of a vehicle suspension on the chassis of a vehicle through a bracket, comprising:
a first bracket having a main part provided on the upper end thereof with first flat connecting portions which are spaced from each other by a recess formed therebetween, said main part being adapted to be connected to the chassis of the vehicle at said connecting portions, and an extension extending from said main part in the longitudinal direction of said chassis and connected to said chassis at a second connecting portion which is vertically spaced from said first connecting portions of said main part and on the opposite side of a swinging axis of said lower suspension arm as said first connecting portions of said main part;
said first and second connecting portions being disposed with a difference in level therebetween, and said swinging axis being positioned between said first and second connecting portions.
a stabilizer provided on said first bracket;
a second bracket for securing said stabilizer on said first bracket; and
a mounting portion provided on an end of said lower suspension arm and provided with an upper flattened surface and a lower portion having a configuration conforming with said recess formed in said main part of said first bracket.

12. A structure for swingably supporting a lower suspension arm of a vehicle suspension according to claim 11, wherein the portion of said first bracket holding said stabilizer has a recess and said extension of said bracket is bent a plurality of times in directions which cross the direction in which said extension extends, so as to increase the rigidity of said bracket, and wherein bolt holes for receiving bolts which secure said bracket to said chassis are formed in said flattened connecting portions of said main part and in said extension of said bracket.

13. A structure for supporting a lower suspension arm of a vehicle suspension according to claim 11, wherein said main part and said extension of said bracket are formed unitary with each other by press work.

* * * * *